US009699161B2

United States Patent
Ducker et al.

(10) Patent No.: US 9,699,161 B2
(45) Date of Patent: Jul. 4, 2017

(54) AUTHENTICATION MECHANISM

(71) Applicant: Twitter, Inc., San Francisco, CA (US)

(72) Inventors: Michael Ducker, San Francisco, CA (US); Sean Cook, San Francisco, CA (US); Jeffrey Seibert, Jr., San Francisco, CA (US); Alex Roetter, San Francisco, CA (US); Kevin Weil, San Francisco, CA (US); Akash Garg, San Francisco, CA (US); Jeremy Gordon, San Francisco, CA (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 14/698,819

(22) Filed: Apr. 28, 2015

(65) Prior Publication Data
US 2015/0312236 A1 Oct. 29, 2015

Related U.S. Application Data

(60) Provisional application No. 61/986,094, filed on Apr. 29, 2014, provisional application No. 62/067,309, filed on Oct. 22, 2014.

(51) Int. Cl.
*G06F 7/04* (2006.01)
*G06F 15/16* (2006.01)
(Continued)

(52) U.S. Cl.
CPC .......... *H04L 63/08* (2013.01); *H04L 63/0838* (2013.01); *H04L 63/0876* (2013.01);
(Continued)

(58) Field of Classification Search
CPC ....... H04L 63/08; H04L 63/10; H04L 63/102; H04L 63/0876; H04W 12/06
(Continued)

(56) References Cited

U.S. PATENT DOCUMENTS

2006/0002556 A1 1/2006 Paul
2009/0279682 A1 11/2009 Strandell et al.
(Continued)

OTHER PUBLICATIONS

Czeskis, A. et al., "Protected Login," Financial Cryptography and Data Security, Springer, Berlin Heidelberg, Mar. 2, 2012, pp. 44-52.
(Continued)

*Primary Examiner* — Kambiz Zand
*Assistant Examiner* — Stephen Sanders
(74) *Attorney, Agent, or Firm* — Fenwick & West LLP

(57) ABSTRACT

A system and method including: receiving, from a client device, an authorization request originating from an authorization module of an application executing on the client device, where the authorization request includes an identifier identifying the client device; causing transmission, based on the identifier, of a verification message to the client device, where the verification message includes a verification code; receiving a confirmation of the verification code from the authorization module of the application executing on the client device; authenticating the application based on the receiving the confirmation of the verification code; determining that the client device identified by the identifier corresponds to a user account including secure user data associated with a user; and transmitting a unique token verifying that the application is authorized to sign into the user account, where: the unique token uniquely identifies the user account to the application, and the secure user data is not shared with the application.

20 Claims, 8 Drawing Sheets

(51) Int. Cl.
    *G06F 17/30* (2006.01)
    *H04L 29/06* (2006.01)
(52) U.S. Cl.
    CPC ............ *H04L 63/10* (2013.01); *H04L 63/067* (2013.01); *H04L 63/1466* (2013.01); *H04L 63/18* (2013.01)
(58) Field of Classification Search
    USPC .......................................................... 726/4
    See application file for complete search history.

(56) References Cited

U.S. PATENT DOCUMENTS

| | | | |
|---|---|---|---|
| 2011/0270833 A1* | 11/2011 | von Kaenel | ...... G06F 17/30241 707/736 |
| 2013/0013553 A1 | 1/2013 | Stibel et al. | |
| 2013/0139239 A1 | 5/2013 | Jillings | |
| 2014/0108486 A1* | 4/2014 | Borzycki | ............ G06F 21/6218 709/201 |

OTHER PUBLICATIONS

Hoffman, C., "How to Secure Your Google Account with Google Authenticator," Feb. 8, 2012, 8 pages, May be Retrieved at<URL:http://www.howtogeek.com/105041/>.
PCT International Search Report, PCT Application No. PCT/US2015/028295, Aug. 7, 2015, 4 pages.
PCT International Search Report, PCT Application No. PCT/US2015/028295, Aug. 7, 2015, 9 pages.

* cited by examiner

Connection Graph 450

AUTHENTICATION MECHANISM

CROSS-REFERENCE TO RELATED APPLICATIONS

This application claims the benefit of U.S. Provisional Application No. 61/986,094, filed on Apr. 29, 2014 and entitled "AUTHENTICATION MECHANISM". Application No. 61/986,094 is incorporated by reference herein, in its entirety, for all purposes.

This application also claims the benefit of U.S. Provisional Application No. 62/067,309, filed on Oct. 22, 2014 and entitled "AUTHENTICATION MECHANISM". Application No. 62/067,309 is incorporated by reference herein, in its entirety, for all purposes.

BACKGROUND

The proliferation of electronic devices has increased the popularity and use of both mobile and non-mobile computing devices. For example, personal computers (PCs), mobile smartphones, tablet computing devices, and smart watches have become popular. As a result, users may own and/or use multiple devices. These devices include various operating systems that support the execution of various software applications developed by third parties. For example, users may use these devices to execute web-browsers, email clients, geographical map applications, game applications, music applications, and so on. Users may have user accounts for each of these software applications.

SUMMARY

In general, in one aspect, embodiments relate to a method that can include: receiving, from a client device, an authorization request originating from an authorization module of an application executing on the client device, where the authorization request includes an identifier identifying the client device; causing, in response to the authorization request, transmission of a verification message to the client device using the identifier, where the verification message includes a verification code; receiving a confirmation of the verification code from the authorization module of the application executing on the client device; authenticating the application based on the receiving the confirmation of the verification code; determining, after authenticating the application, that the client device identified by the identifier corresponds to a user account including secure user data associated with a user; and transmitting, to the authorization module of the application, a unique token verifying that the application is authorized to sign into the user account, where: the unique token uniquely identifies the user account to the application, and the secure user data is not shared with the application.

In general, in one aspect, embodiments relate to a system that can include: a computer processor; an identity module executing on the computer processor and configured to enable the computer processor to: receive, from a client device, an authorization request originating from an authorization module of an application executing on the client device, where the authorization request includes an identifier identifying the client device; cause, in response to the authorization request, transmission of a verification message to the client device using the identifier, where the verification message includes a verification code; receive a confirmation of the verification code from the authorization module of the application executing on the client device; authenticate the application based on the receiving the confirmation of the verification code; determine, after authenticating the application, that the client device identified by the identifier corresponds to a user account including secure user data associated with a user; and transmit, to the authorization module of the application, a unique token verifying that the application is authorized to sign into the user account, where: the unique token uniquely identifies the user account to the application, and the secure user data is not shared with the application.

In general, in one aspect, embodiments relate to a method that can include: transmitting, from an authorization module of an application executing on a client device, an authorization request including an identifier identifying the client device, where the authorization request is transmitted for verification that the client device identified by the identifier corresponds to a user account including secure user data associated with a user; receiving, at the authorization module of the application executing on the client device and in response to the authorization request, a verification message including a verification code; transmitting, from the authorization module of the application executing on the client device, a confirmation of the verification code; receiving, at the authorization module, a unique token verifying that the application is authorized to sign into the user account, where: the unique token uniquely identifies the user account to the application, and the secure user data is not shared with the application.

Other embodiments will be apparent from the following description and the appended claims.

BRIEF DESCRIPTION OF THE DRAWINGS

Embodiments are illustrated by way of example, and not by way of limitation, in the figures of the accompanying drawings and in which like reference numerals refer to similar elements.

FIGS. 6A-6G show an example authentication operation in accordance with one or more embodiments.

DETAILED DESCRIPTION

Figure 1:
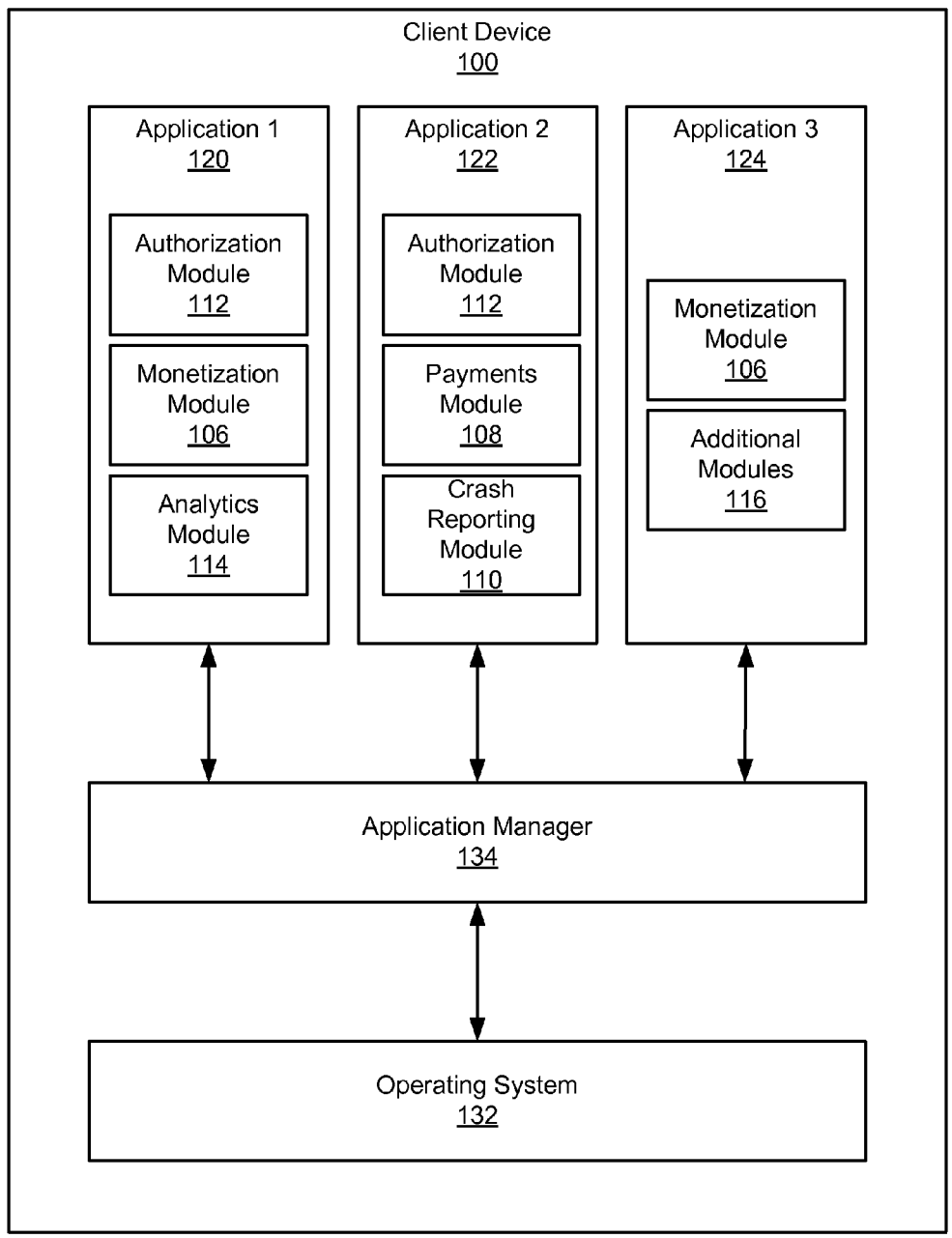
FIG. 1 illustrates a client device in accordance with one or more embodiments.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Specific embodiments will now be described in detail with reference to the accompanying figures. Like elements in the various figures are denoted by like reference numerals for consistency. In the following detailed description of embodiments, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

In general, embodiments provide a method and system for authenticating an application and/or a client device. A third-party application developer can utilize an authorization module to manage authentication for their third-party applications. For example, a software development kit (SDK) may be provided to the third-party application developer for incorporation into their third-party applications. The incorporated or embedded SDK can provide an authorization module configured to communicate with a remote identity module to authenticate the third-party application or client device. The authorization module can provide an identifier of a client device (e.g., a telephone number) to the identity module. The identity module can then communicate with the client device using the identifier to confirm that the third-party application and/or authorization module are included in the client device and/or are authentic. For example, the identity module can provide a verification code to a device identified by the identifier and verify that the client device is in fact the same device as the identified device upon receiving a confirmation of the verification code from the client device.

After authenticating the third-party application (e.g., after determining that a user account is associated with the identifier and/or client device), a unique token associated with an account may be provided that allows the third-party application to sign into the account without providing the full identity or all information of the account. As a result, private user data and/or the identity of the user can be withheld from the third-party application while still allowing the application to sign into the account.

Further, different instances of the same or similar authorization module included in various applications on the same or different devices may include functionality to authenticate the various applications. For example, an authorization module of a first application that has been authenticated may aid an authorization module of a second application to authenticate the second application.

In addition, the authorization module may provide the client device's contacts list to the identity module. Based on information in the contacts list, the identity module may connect various user accounts of a particular application. The identity module may also connect user accounts of various degrees of connection based on a connection graph (that may be developed based on the contacts lists and other contacts lists).

Other modules may be provided through SDKs for developers. For example, modules facilitating monetization (e.g., advertising), analytics, payments, crash reporting, and so on. As a result, developers' efforts may be aided. Moreover, the identity module may monitor delivery performance of various communication channels (e.g., SMS aggregators) for subsequent use.

FIG. 1 illustrates a client device 100 in accordance with one or more embodiments. The client device 100 can include an operating system 132, an application manager 134, and/or one or more applications (e.g., application 1 120, application 2 122, application 3 124). The applications may be third-party applications.

The applications may each include one or more modules provided by one or more SDKs. For example, the applications 120-124 may include a monetization module 106, a payments module 108, a crash reporting module 110, an authorization module 112, an analytics module 114, and additional module 116. The applications may include different instances of the same or similar module. For example, the application 120 and the application 122 may both include an instance of the authorization module 112. The modules in each application may allow the respective application to communicate with other devices or modules to perform a function associated with the modules. For example, the authorization module 112 may include functionality to communicate with the application manager 134, an identity module 220 (FIG. 2), third-party application servers 230 (FIG. 2), and/or various modules 240-248 (FIG. 2).

Figure 2:
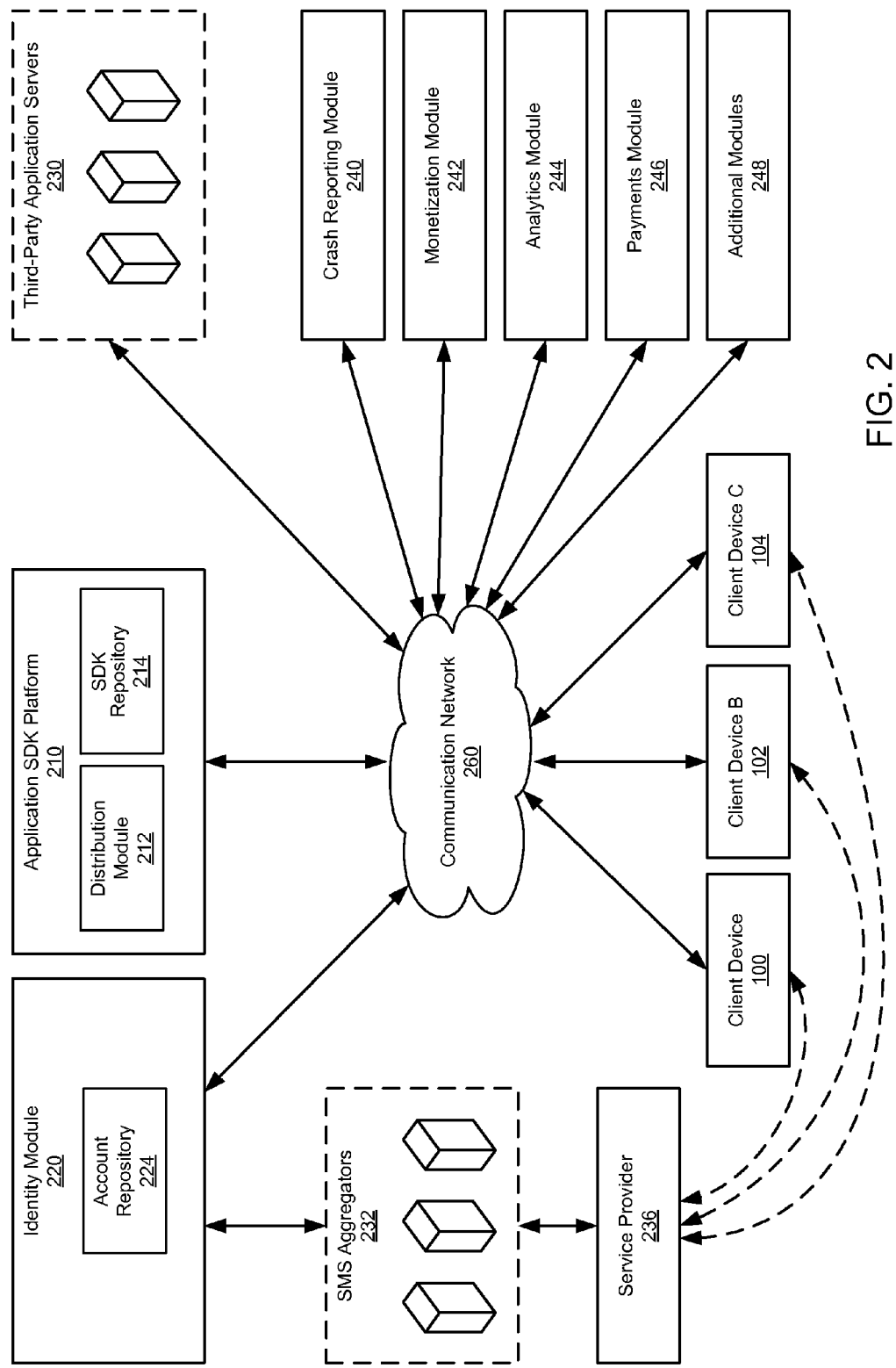
FIG. 2 illustrates an identity module and a client device, in accordance with one or more embodiments.

FIG. 2 illustrates the identity module 220 and the client device 100, in accordance with one or more embodiments. The identity module 220 may include an account repository 224. Various components of the identity module 220 can be located on the same device (e.g., a server, mainframe, desktop Personal Computer (PC), laptop, and any other device) or can be located on separate devices connected by a network (e.g., a local area network (LAN), a wide area network (WAN), the Internet, etc.). Those skilled in the art will appreciate that there can be more than one of each separate component running on a device, as well as any combination of these components within a given embodiment.

FIG. 2 also illustrates the client device 100 and other client devices such as a client device B 102 and a client device C 104 that may be the same as or similar to the client device 100. FIG. 2 also illustrates SMS aggregators 232 that can include functionality to communicate with the client devices 100-104. For example, the SMS aggregators 232 can communicate with the client devices 100-104 through a service provider 236 (e.g., telecommunication company) of the client devices.

FIG. 2 also illustrates an application SDK platform 210 including a distribution module 212 and an SDK repository 214. The distribution module 212 can provide SDKs from the SDK repository 214 for inclusion in third-party applications. For example, third-party application developers may receive the SDKs and embed the SDKs in third-party applications. As a result, the third-party applications may include one or more modules provided by the SDKs.

FIG. 2 also illustrates the third-party application servers 230, a crash reporting module 240, a monetization module 242, an analytics module 244, a payments module 246, and additional modules 248. The modules 240-248 may be provided by an SDK (e.g., SDKs from the application SDK platform 210). The modules 240-248 may include functionality to communicate with the modules on the client devices 100-104 (e.g., the modules 106-116 of FIG. 1). For example, the crash reporting module 240 may communicate with the crash reporting module 110 regarding details of the application's 122 execution. In another example, the monetization module 242 may communicate with the monetization module 106 regarding details of the application's 120 advertising events. A communication network 260 may communicatively couple various components of FIG. 2 with one another.

Figure 3:
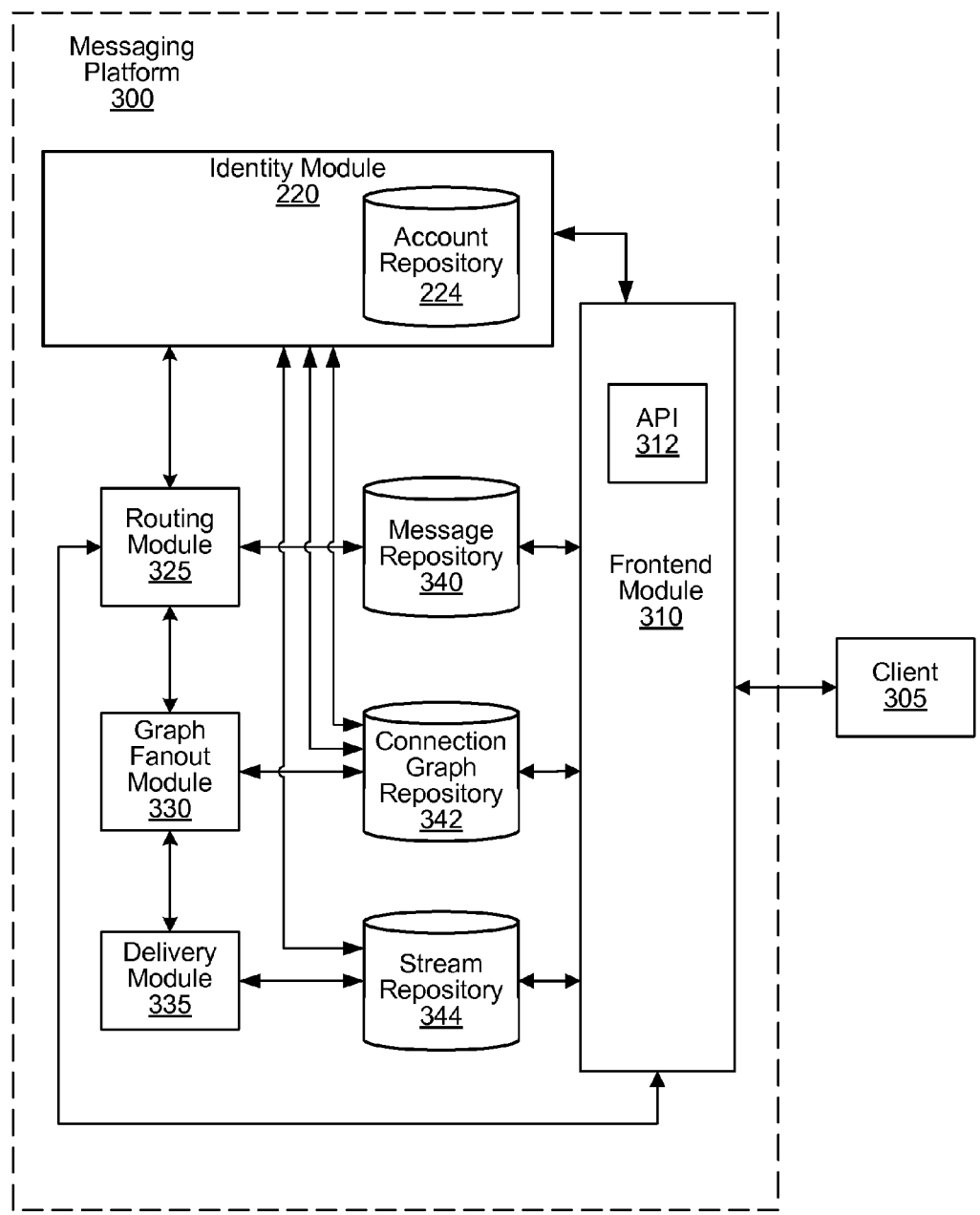
FIG. 3 illustrates a messaging platform and a client device in accordance with one or more embodiments.

FIG. 3 illustrates a messaging platform 300 and a client device 305 in accordance with one or more embodiments. As shown by FIG. 3, the messaging platform 300 may include multiple components including the identity module 220, a frontend module 310 with an application programming interface (API) 312, a routing module 325, a graph fanout module 330, a delivery module 335, the account repository 224, a message repository 340, a connection graph repository 342, a stream repository 344, and an account repository 346. Various components of the messaging platform 300 can be located on the same device (e.g., a server, mainframe, desktop Personal Computer (PC), laptop, and any other device) or can be located on separate devices connected by a network (e.g., a local area network (LAN), a wide area network (WAN), the Internet, etc.). Those skilled in the art will appreciate that there can be more than one of each separate component running on a device, as well as any combination of these components within a given embodiment.

In one or more embodiments, the messaging platform 300 is a platform for facilitating real-time communication between one or more entities. For example, the messaging platform 300 may store millions of accounts of individuals, businesses, and/or other entities (e.g., pseudonym accounts, novelty accounts, etc.). One or more users of each account may use the messaging platform 300 to send messages to other accounts inside and/or outside of the messaging platform 300. The messaging platform 300 may be configured to enable users to communicate in "real-time", i.e., to converse with other users with a minimal delay and to conduct a conversation with one or more other users during concurrent sessions. In other words, the messaging platform 300 may allow a user to broadcast messages and may display the messages to one or more other users within a reasonable time frame so as to facilitate a live conversation between the users. Recipients of a message may have a predefined graph relationship with an account of the user broadcasting the message (e.g., based on an asymmetric graph representing accounts as nodes and edges between accounts as relationships). In one or more embodiments, the user is not an account holder or is not logged in to an account of the messaging platform 300. In this case, the messaging platform 300 may be configured to allow the user to broadcast messages and/or to utilize other functionality of the messaging platform 300 by associating the user with a temporary account or identifier.

Figure 4:
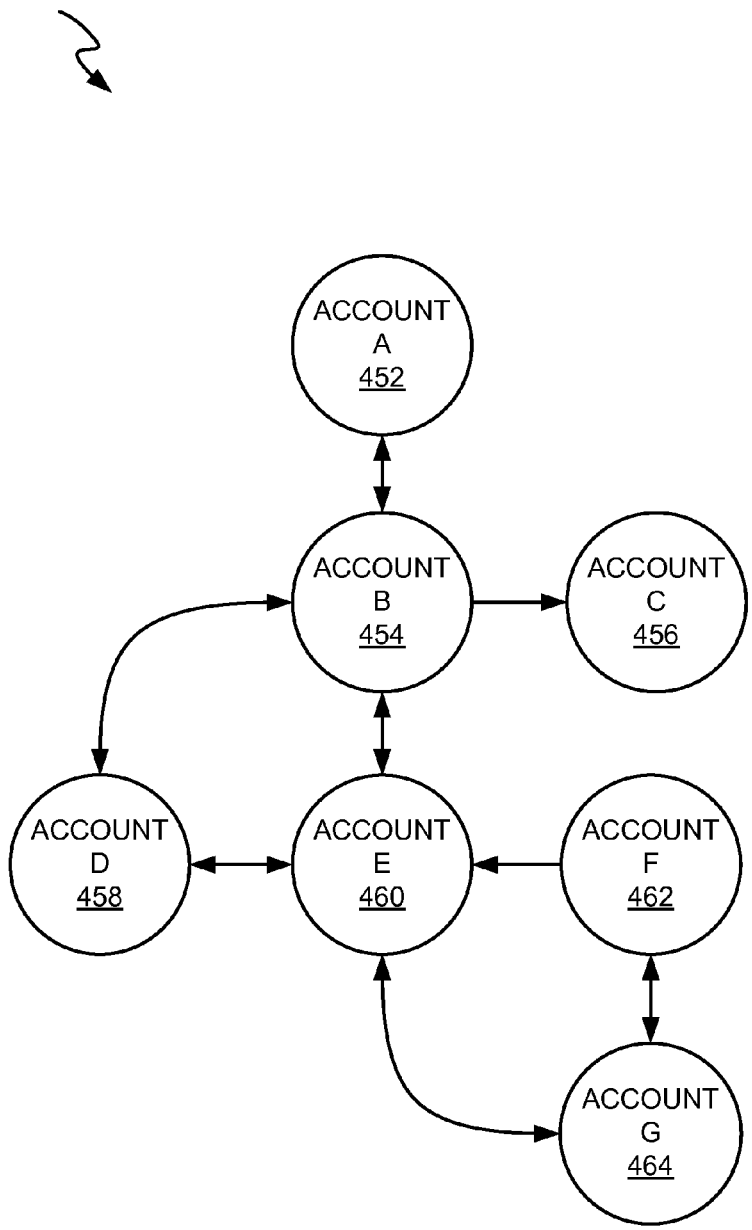
FIG. 4 illustrates an example depiction of a connection graph in accordance with one or more embodiments.

FIG. 4 illustrates an example depiction of a connection graph 450 in accordance with one or more embodiments. In one or more embodiments, the connection graph repository 342 is configured to store one or more connection graphs. As shown by FIG. 4, the connection graph 450 includes multiple components including nodes representing accounts of the messaging platform 300 (i.e., Account A 452, Account B 454, Account C 456, Account D 458, Account E 460, Account F 462, Account G 464) and edges connecting the various nodes.

The connection graph 450 is a data structure representing relationships (i.e., connections) between one or more accounts. The connection graph 450 represents accounts as nodes and relationships as edges connecting one or more nodes. A relationship may refer to any association between the accounts (e.g., following, friending, subscribing, tracking, liking, tagging, and/or etc.). The edges of the connection graph 450 may be directed and/or undirected based on the type of relationship (e.g., bidirectional, unidirectional), in accordance with various embodiments.

Many messaging platforms include functionality to broadcast streams of messages to one or more accounts based at least partially on a connection graph representing relationships between those accounts (see FIG. 4). A stream may be a grouping of messages associated with one or more accounts or can reflect any arbitrary organization of messages that is advantageous for the user of an account. In accordance with various embodiments, a "message" is a container for content broadcasted/posted by or engaged by an account of a messaging platform. Messages can be authored by users and can include any number of content types (multimedia, text, etc.).

Figure 5:
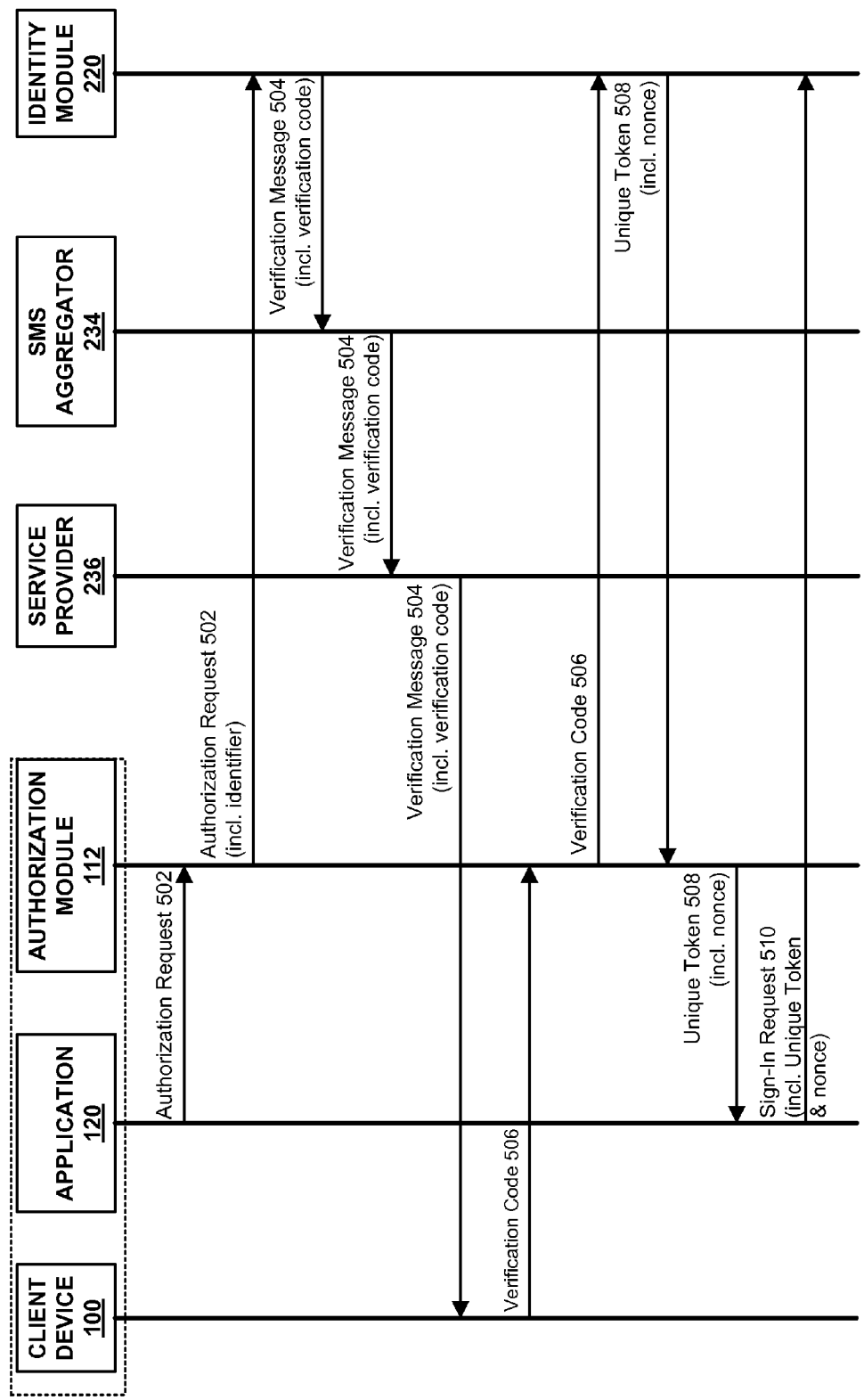
FIG. 5 illustrates a sequence diagram for authorizing an application in accordance with one or more embodiments.

FIG. 5 illustrates a sequence diagram for authorizing an application in accordance with one or more embodiments. FIG. 5 includes the client device 100, application 120, authorization module 112, service provider 236, SMS aggregator 234, and identity module 220. It should be appreciated that FIG. 5 illustrates one example for explanatory purposes and that other components and configurations are possible. For example, the authorization module 112 may be included in the application 120 of the client device 100, or the authorization module 112 may be included in a different application of the client device or an associated client device.

In one or more embodiments, the authorization module includes functionality to transmit an authorization request including an identifier identifying the client device. For example, the authorization module 112 of the application 120 executing on a client device 100 may transmit an authorization request 502 for the identity module 220. The authorization request 502 may originate from the application 120 or may be originally caused to be transmitted by the application 120. The authorization request may be ultimately transmitted by the client device 100, the application 120, and/or the authorization module 112 via the communication network 260 (e.g., through a LAN, WAN, and/or the Internet).

The identifier may identify the client device 100 using a unique or semi-unique identifier (e.g., a telephone number and/or an email address). For example, the client device 100 may be associated with a telephone number "555-555-0123", and the identifier may identify the client device 100 using "555-555-0123".

In one or more embodiments, the authorization request is transmitted for verification that the client device identified by the identifier corresponds to a user account including secure user data associated with a user. For example, the authorization module 112 may transmit the authorization request 502 including the identifier for verification that the client device 100 corresponds to a particular user account. The user account may be included in the account repository 224 of the identity module 220. The identity module 220 and/or another module may include secure user data associated with the particular user account.

In one or more embodiments, the identity module includes functionality to receive the authorization request originating from the authorization module of the application executing on the client device. For example, the identity module 220 may receive the authorization request 502 from the authorization module 112 through the communication network 260.

In one or more embodiments, the identity module includes functionality to cause transmission, based on the identifier, of a verification message to the client device. For example, in response to the authorization request, the identity module 220 may generate a verification message 504 and cause transmission of the verification message 504 to the authorization module 112, using the identifier. The verification message may be transmitted at least in part by a Short Message Service (SMS) message, an Unstructured Supplementary Service Data (USSD) message, an email address, and/or any other message form or medium. For example, the identity module 220 may cause transmission of a cellular text message including the verification message

504 using the provided identifier (e.g., an SMS message to the telephone number "555-555-0123").

In one or more embodiments, the identity module includes functionality to identify a service provider of the client device identified by the identifier. The identity module 220 may determine that the service provider 236 is the service provider of the client device 100 based on the identifier. For example, the identity module 220 may determine a particular telecommunications service provider based on the telephone number "555-555-0123". The identity module 220 may query a third-party service to make the determination.

In one or more embodiments, the identity module includes functionality to select an SMS aggregator based on the service provider. An SMS aggregator may be an intermediary between a sender of an SMS message and a service provider providing the SMS service to client devices (e.g., a cellular telecommunications company). An SMS aggregator may facilitate delivery of a message to a serve provider for ultimate transmission to a client device subscribing to the services of the service provider. The identity module 220 may select a particular SMS aggregator (e.g., the SMS aggregator 234) based on the delivery performance of a set of SMS aggregators (e.g., the SMS aggregators 232) that are capable to communicate with the service provider.

In one or more embodiments, the identity module includes functionality to provide the verification message to the SMS aggregator for transmission to the client device. For example, the identity module 220 may provide the verification message 504 to the SMS aggregator 234. The SMS aggregator 234 may then transmit the verification message 504 to the service provider 236, which may in turn transmit the verification message 504 to the client device 100.

The service provider may provide the verification message to the client device as an SMS message. For example, the service provider 236 may transmit an SMS message to the client device 100 using the telephone number "555-555-0123". However, it should be understood that other communication protocols and/or message types are possible. For example, the verification message may be provided through a USSD message. In one or more embodiments, the verification message is transmitted in part or in full through the communications network 260.

In one or more embodiments, the verification message includes a verification code. The verification code may include a random or pseudo-random code that can be used to authenticate the client device. The verification code may be provided in the form of an alphanumerical string, a Uniform Resource Locator (URL), an application link, a web link, a deep link, an image, an audio recording, binary file, a text-based file, and/or any other type of information that may include a verification code.

In one or more embodiments, the authorization module includes functionality to receive the verification code. The verification message 504, and thereby the verification code 506, may be first received from the service provider 236 by the operating system 132 of the client device 100 and/or a messaging application of the client device 100. The authorization module 112 may receive the verification message 504 and/or the verification code 506 through the operating system 132 and/or messaging application.

For example, once the client device 100 receives the verification message 504, a user of the client device 100 may retrieve the verification code 506 from the operating system 132 and/or messaging application and provide the verification code 506 to the authorization module 112.

In another example, the authorization module 112 may monitor the messages received by the operating system 132 and/or messaging application. For example, the authorization module 112 may frequently (e.g., every 1 second) check the messages received by the operating system 132. If the authorization module 112 identifies a verification message 504 ultimately provided by the identity module 220, the authorization module 112 may retrieve the verification code 506 from the verification message 504.

In another example, the verification code 506 may be provided by a deep link. A deep link may be a reference to a location (e.g., a URL). The deep link may include the verification code 506 itself (e.g., as a parameter in a URL) or may direct the authorization to a location that includes the verification code 506. The deep link may be activated by a user of the client device (e.g., clicking or tapping a hypertext representing the deep link, copying and pasting the deep link into the address bar of a browser, etc.). Or the deep link may be retrieved by the authorization module 112 from messages sent to the client device after being detected by the authorization module 112 and thereafter activated by the authorization module 112.

The deep link may direct the client device 100 to a location outside of the client device 100 (e.g., through the communication network 260, to the Internet, etc.). The location may include the verification code 506, from which the user of the device or the authorization module 112 may retrieve the verification code 506. The location may be operable to launch the application 120 and/or the authorization module 112 and provide the verification code 506.

The deep link may direct the client device 100 to a location within the client device 100. For example, the deep link may cause the application 120 and/or the authorization module 112 to launch. Parameters within the deep link may provide the verification code 506 to the authorization module 112.

In one or more embodiments, the authorization module includes functionality to transmit a confirmation of the verification code. The confirmation may include the verification code 506 or a representation of the verification code 506 (e.g., a cryptographic hash value representing the verification code 506). The authorization module 112 may transmit the verification code 506 to obtain authorization. The verification code 506 may be transmitted from the authorization module 112 to the identity module 220 through the communication network 260. The identity module may include functionality to receive the confirmation of the verification code from the authorization module.

In one or more embodiments, the identity module includes functionality to authenticate the application based on receiving the confirmation of the verification code. For example, if the verification code 506 is successfully provided back to the identity module 220 from the authorization module 112 (e.g., via a confirmation), the identity module 220 can confirm that the client device 100 is in fact associated with the identifier included in the authorization request 502.

In one or more embodiments, the identity module includes functionality to determine that the client device identified by the identifier corresponds to a user account including secure user data associated with a user. For example, the identity module 220 may determine that a user account in the account repository 224 corresponds to the identifier and/or client device 100. The user account may include secure user data associate with the user (e.g., birthdate, gender, browsing history, engagement history with other user accounts, etc.).

In one or more embodiments, the identity module includes functionality to, based on the confirmation, confirm that the client device providing the authorization request is in fact the client device identified by the identifier. The identity module may then authenticate the application after determining that the client device corresponds to a user account (e.g., in the account repository 224).

In one or more embodiments, the identity module includes functionality to transmit a unique token verifying that the application is authorized to sign into the user account. For example, the identity module 220 may transmit the unique token 508 to the authorization module 112. The unique token 508 may be transmitted via the communications network 260. In one or more embodiments, the authorization module 112 may then provide the unique token 508 to the application 120.

In one or more embodiments, the unique token uniquely identifies the user account to the application. For example, the unique token 508 may uniquely correspond to the user account such that no other user account shares the same unique token 508. Because the unique token 508 may uniquely identify the user account, the unique token 508 may be provided for use by the application 120 (e.g., sign-in) instead of an identifying handle of the user account (e.g., a user name, a real name, etc.). As a result, identifying information of the user associated with the user account may be withheld from the application 120.

In one or more embodiments, the secure user data is not shared with the application. The application 120 and/or the authorization module 112 may use the unique token 508 to sign in the application 120. However, although the application 120 may be signed in, the secure user data of the user account does not necessarily need to be provided to the application 120. Instead, the application 120 may only be permitted to sign in using the unique token 508 but otherwise not permitted to access the secure user data.

In one or more embodiments, the identity module includes functionality to transmit a cryptographic nonce to the authorization module of the application with or when transmitting the unique token. A cryptographic nonce may be an arbitrary (often randomly generated) number that is used to secure communication between two or more entities. The identity module 220 may include a nonce alongside the unique token 508. The authorization module 112 may receive the nonce and may provide the nonce to the application 120 along with the unique token 508.

In one or more embodiments, the identity module includes functionality to store the cryptographic nonce as a most-recently transmitted nonce in association with the authorization request. The identity module 220 may maintain a history of transmitted nonces in association with the authorization request and include the nonce as the most-recently transmitted nonce. The most-recently transmitted nonce may be used to authenticate a subsequent transmission from the client device 100.

In one or more embodiments, the identity module includes functionality to receive a sign-in request including a hashed value generated from the cryptographic nonce. For example, the authorization module 112 or the application 120 may generate the hashed value based on the cryptographic nonce and then provide the hashed value to the identity module 220 and a sign-in request 510. In some embodiments, the identity module includes functionality to receive the sign-in request with the nonce itself (not a hashed value of the nonce).

In one or more embodiments, the identity module includes functionality to determine that the sign-in request is timely by determining that a locally generated hash value of the most-recently transmitted nonce matches the hashed value included in the sign-in request. The identity module 220 may compare the received hashed value with a locally-generated hash value of the most recently transmitted nonce. If the received hashed value matches the locally-generated hash value, then the identity module 220 determines that the received sign-in request 510 is valid and not a result of a replay attack. In some embodiments, the identity module 220 may compare a received nonce with the most recently transmitted nonce. If the received nonce matches the most recently transmitted nonce, then the identity module 220 determines that the received sign-in request 510 is valid and not a result of a replay attack.

In one or more embodiments, the identity module includes functionality to transmit a sign-in confirmation. For example, the identity module 220 may transmit a sign-in confirmation to the authorization module 112 or the application 120 in response to the sign-in request 510 after determining that the sign-in request 510 is authentic. The sign-in confirmation may confirm that the application 120 is signed in.

In one or more embodiments, the identity module may authorize the application using other approaches. For example, the authorization module 112 may send a text message for the identity module 220 (e.g., along with the authorization request 502 or in response to a request from the identity module 220). The identity module 220 may determine that the telephone number used to send the text message matches the provided identifier. Further, the authorization module 112 may not include the identifier in the authorization request 502. Instead, the identifier can be received from the service provider 236 that facilitates transmission of the text message from the client device 100 to the identity module 220.

In another example, the identity module 220 may transmit a telephone number (from a set of telephone numbers) to the authorization module 112 in response to receiving the authorization request 502. The authorization module 112 may then cause a text message or phone call to the telephone number. If the text message or phone call is received at the telephone number within a predetermined amount of time, the identity module 220 may determine that the client device 100 is authenticated.

In one or more embodiments, the authorization module includes functionality to transmit, from a second authorization module of a second application executing on the client device, a second authorization request. For example, returning to FIG. 1, the authorization module 112 of the application 2 122 (the "second authorization" module for discussion purposes) may transmit a second authorization request. The identity module may include functionality to receive the second authorization request.

In one or more embodiments, the second authorization request includes the identifier. The second authorization request may include the same identifier (e.g., telephone number) as the authorization request from the application 120 because the second application 122 may be included in the same client device 100.

In one or more embodiments, the identity module includes functionality to transmit, to the second authorization module, a second unique token verifying that the second application is authorized to sign into the user account. The second unique token may uniquely identify the user account to the second application and may be different from the unique token. More than one unique token may identify the user account. As a result, the unique token (i.e., provided in response to an earlier authorization request) and the second unique token (i.e., provided in response to the second authorization request) may both identify the user account while being different from one another. Because different tokens may be provided to different applications, the identity and/or private data of a user account can be further hidden or obfuscated from the applications. As a result, the applications 120-124 will not be able to identify the user from the unique tokens for each application.

In one or more embodiments, the authorization module includes functionality to receive, at the second authorization module, the second unique token verifying that the second application is authorized to sign into the user account. As a result, the second application 122 may sign into the user account using the second unique token.

In one or more embodiments, the second application and the second authorization module can be included in a second client device. The second application may request authorization from the identity module using the second authorization module as discussed above. However, because the second application and the second authorization module can be included in a different device, a second identifier (different from the identifier) may be provided to the identity module. The identity module may authenticate the second application the same way using the second identifier. The identity module may confirm that the second application is authorized to sign into the user account based on an association of the second client device and/or the second identifier with the user account (e.g., the association being stored in the account repository 224). The third authorization request may include a different identifier (e.g., telephone number) as the authorization request from the application 120.

In one or more embodiments, the second application requesting authorization and the second authorization module can be together on another device than the client device identified by the identifier. For example, the other device may not have capability to be reached by a telecommunications service provider (e.g., a tablet without cellular connectivity). Instead, the identifier of the client device is used to provide the verification code, while the second application and/or second authorization module provide a confirmation of the verification code to the identity module through communication network (e.g., through the Internet).

In one or more embodiments, the authorization module and the second authorization module (whether on the same or different client devices) include functionality to transmit secure user data that represents use of the application and the second application by the user for storage in the user account. For example, web browsing history of the user, engagement history with other user accounts on a messaging platform, and so on. Secure user data other than that representing use of the applications may be transmitted. For example, the authorization modules may transmit information about a music library of the client device 100, other applications that are installed, real-time data (e.g., geographic location and/or heading), and so on. In one or more embodiments, the identity module includes functionality to receive (e.g., from the authorization module and the second authorization module) the secure user data and store the secure user data in the user account. For example, the identity module 220 may store the secure user data (e.g., in the account repository 224).

In one or more embodiments, the authorization module includes functionality to transmit an advertisement request from the application. For example, the application 120 may include an advertisement placement opportunity, such as a banner advertisement, a popup advertisement, or an interstitial advertisement. The application 120 may request an advertisement (e.g., from the authorization module 112, an advertisement module (e.g., residing on the client device), the identity module 220, and/or another location) for inclusion in the advertisement placement opportunity. In some embodiments, the advertisement request is transmitted by the application and/or an advertisement module.

In one or more embodiments, the identity module includes functionality to receive an advertisement request from the application and provide an advertisement based on the stored secure user data associated with the second application. For example, if the identity module determines from the secure user data that the user spends a significant amount of time searching for and viewing content related to golf, the identity module may provide an advertisement related to golf. In another example, if the identity module determines from the secure user data that the user spends a significant amount of time with certain apps (sports video games, shopping applications, news sources, movie viewers, etc.), the identity module may provide an advertisement related to those apps. As a result, the identity module can target users based on their known interests and behaviors.

In one or more embodiments, the authorization module includes functionality to receive an advertisement based on the stored secure user data associated with the second application. In some embodiments, the advertisement is received by the application and/or an advertisement module. The advertisement may then be placed to satisfy the advertisement placement opportunity in the application. It should be appreciated that other modules of the application 120 may perform some or all of the functions of the authorization module 112. For example, the monetization module 106 may include functionality to transmit the advertisement request and receive the advertisement.

In one or more embodiments, the authorization module includes functionality to transmit a set of contacts of the client device. The contacts can include data such as phone numbers, names, addresses, e-mail addresses, etc., of other users. The authorization module 112 may retrieve a contacts list of the client device 100 and may transmit contacts of the contacts list. The authorization module 112 may retrieve a contacts list of the application 120 (e.g., other user accounts associated with the user account of the application 120). In one or more embodiments, the identity module includes functionality to receive the set of contacts of the client device.

In one or more embodiments, the identity module includes functionality to identify, based on the set of contacts, a set of user accounts using other instances of the application. The identity module 220 may include information about various user accounts, such as the applications that each user account uses. The identity module 220 may determine which user accounts, associated with the set of contacts, are also using the application 120.

In one or more embodiments, the identity module includes functionality to provide a set of unique tokens representing the set of user accounts to the authorization module. The identity module 220 may include a unique token for each user account for each application. As a result, the identity module 220 can identify the unique token for each identified user account for the application, and provide the identified unique tokens. In some embodiments, the identity module 220 may use a connection graph (e.g., the connection graph 450 or the connection graph repository 342) to determine user accounts for which to provide unique tokens. For example, the identity module 220 may unique tokens for second or third degree connections of the user account in the connection graph.

In one or more embodiments, the authorization module includes functionality to receive the set of unique tokens representing the set of user accounts using other instances of the application (based on the set of contacts). The authorization module may be operable to provide the set of unique tokens to the application. Because the unique tokens do not include identifying information about their respective user accounts, personal information of the users corresponding to the user accounts is withheld from the application 120. However, the application 120 can utilize the unique tokens as "handles" to those user accounts.

Accordingly, the application 120 can perform functions like adding the user accounts as "friends" that are also using the application 120 or otherwise associating the user accounts with the user account. The application 120 can also recommend "friends" based on the various degrees of connection in the connection graph (e.g., second or third degree connections may be recommended friends). As a result, for example, the identity module 220 may connect user accounts of the messaging platform 300 (FIG. 3) (e.g., based on the connection graph repository 342).

In one or more embodiments, the authorization module includes functionality to transmit, to a third-party server associated with the application, the unique token. The unique token can be used to maintain the anonymity and/or privacy of a user of the client device 100 from the application 120 and the third-party server(s) 230. For example, upon receiving the unique token from the identity module 220, the application 120 can transmit the unique token to the third-party servers 230 to access application data associated with the unique token. The client device 100 can therefore be provided with access to their user account managed by the third-party application server using only the unique token.

The account repository 224 can maintain unique tokens associated with the various accounts and applications 120-124. The account index can list the unique tokens and the identity module 220 can identify the appropriate unique token from the requesting application and the identifier received with the authorization request.

In one or more embodiments, the client device 100 can include functionality to transmit, to the third-party servers 230 associated with the application 120, the unique identifier of the account corresponding to the application 120. The third-party servers 230 can use the unique identifier to identify third-party application data associated with the user and the application 120. Using the unique identifier allows the user to remain anonymous to the third-party servers 230 because the third-party server is only provided with the unique identifier.

In one or more embodiments, the authorization module includes functionality to receive, from the third-party server, application data of a third-party user account of the third-party server associated with the unique token. For example, if the application 120 is a video game, the third-party application data can be data indicating a level that the user had reached in the application 120. In another example, if the application 120 is a shopping application, the third-party application data can indicate items in the shopping cart for the application 120.

In one or more embodiments, the authorization module includes functionality to receive the authorization request from the application. For example, the authorization module 112 may receive the authorization request 502 from the application 120. In one or more embodiments, the authorization module includes functionality to transfer, in response to the authorization request, foreground control of the client device from the application to the authorization module. For example, the application 120 may have foreground control of the client device 100 while the application 120 executes as a foreground process of the operating system 132. The application 120 may transfer the foreground control of the client device 100 to the authorization module 112. The authorization module 112 may become the foreground process, or the application 120 may remain as the foreground process but display a user interface controlled by the authorization module 112. The application 120 may transfer the foreground control along with or before providing the authorization request to the application 120.

In one or more embodiments, the authorization module includes functionality to transfer, in response to receiving the unique token, foreground control of the client device from the authorization module to the application. For example, once the identity module 220 has authorized the application 120, foreground control may be returned to the application 120 from the authorization module 112. The foreground control may be returned upon receiving the unique token 508 and/or upon receiving a sign-in confirmation.

In one or more embodiments, the identity module includes functionality to cause transmission of a set of verification messages using a set of SMS aggregators based on the service provider. For example, returning to FIG. 2, the identity module 220 may provide verification messages to the SMS aggregators 232 in response to multiple authorization requests from the client devices 100-104. Each of the SMS aggregators 232 may transmit each verification message to the respective client device.

In one or more embodiments, the identity module includes functionality to monitor delivery performance of the set of verification messages by each of the set of SMS aggregators. Various SMS aggregators may perform their services with varying degrees of reliability and performance, and their reliability and performance may vary with various service providers and with time. For example, 99% of messages sent via a particular SMS aggregator may be successfully delivered through a first service provider, while 75% of messages sent may be successfully delivered through a second service provider. One day later, 80% of messages sent through both the first and second service provider may be successfully delivered. Further, a different SMS aggregator may maintain a success rate of 99% through both the first and second service provider at all times. Delivery performance can be measured by metrics besides ultimate successful delivery. For example, the speed of delivery may be a delivery performance metric.

Delivery performance can be measured based on a number of times that the verification code is requested by the authorization module 112. For example, after the authorization module 112 has transmitted the authorization request 502, the authorization module 112 may transmit the authorization request 502 (and/or a different request for the verification code) again. The authorization module 112 may transmit additional requests because no verification message has been received after a predetermined waiting period. Or, a user of the client device 100 may direct the authorization module 112 to submit an additional request because no verification message has been received.

Delivery performance can be measured based on the delivery performance for messages other than those for verifying the application. The identity module 220 may cause transmission of messages, through the SMS aggregators 232, for other purposes. For example, the identity module 220 may cause transmission of messages to facilitate the transfer and installation of other applications on the client device 100.

In one or more embodiments, the identity module includes functionality to calculate a ranking score of each of the set of SMS aggregators based on delivery performance. For example, the identity module 220 may rank each of the SMS aggregators 232 based on delivery performance such as delivery success rate, delivery timeliness, and/or delivery cost. The identity module 220 may calculate the ranking scores real-time to adapt to changes in delivery performance or using a moving window (e.g., the most recent 2 days) to account for average delivery performance. The identity module 220 may calculate the ranking scores using both real-time and moving window approaches while weighting one approach more than the other (e.g., weighting the real-time approach over the moving window approach).

In one or more embodiments, the identity module includes functionality to select, based on the ranking scores, a preferred SMS aggregator from the set of SMS aggregators for subsequent verification message transmissions. The identity module 220 may choose an SMS aggregator (such as SMS aggregator 234) for future verification messages to the client devices 100-104 based on the ranking scores. However, the identity module 220 may continue to select other SMS aggregators from the set of SMS aggregators for subsequent verification message transmissions to continue monitoring/ranking delivery performance of those SMS aggregators.

In one or more embodiments, the client device can include functionality to receive an authorization to install the application manager 134 on the client device 100. For example, the client device 100 can prompt a user to authorize installation of the application manager 134. The application manager 134 may be provided by the identity module 220.

The application manager 134 may be configured to communicate with the authorization module 112 and the identity module 220. Communication between the identity module 220 and the authorization module 112 can be facilitated by the application manager 134 such that the authorization module 112 and the identity module 220 do not communicate with each other directly.

For example, the application manager 134 can act as an intermediary between the authorization module 112 and the identity module 220. Upon execution of the authorization module 112, the authorization module 112 can transmit a message to the application manager 134 requesting to authenticate the application 120. For example, if the authorization module 112 is executed as part of the application 120, the authorization module 112 can transmit a request to the application manager 134 requesting to authenticate the application 120. Upon receiving the request, the application manager 134 can transmit an authorization request to the identity module 220. For example, the application manager 134 can communicate with the operating system 132 to cause the client device 100 to transmit the authorization request. Further, the application manager 134 can obtain the identifier to include in the authorization request. For example, the application manager 134 can communicate with the operating system 132 to gather the identifier from the operating system 132. Alternatively, the application manager 134 can request that the operating system 132 include the identifier in the authentication request.

In one or more embodiments, the application manager 134 can include functionality to perform some or all of the functions of the authorization module 112. For example, the application manager 134 may monitor the messages received by the operating system 132 and/or messaging application. In another example, the application manager 134 may retrieve the contacts list of the client device 100.

The application manager 134 may manage authorization requests from the applications executing on the client device 100. For example, upon execution, the embedded authorization module 112 can communicate with the application manager 134 executing on the client device 100 to request authentication of the application 120 that caused execution of the authorization module 112. Upon receiving the request, the application manager 134 can cause the client device 100 to transmit the authorization request to the identity module 220.

FIGS. 6A-6G show an example authentication operation in accordance with one or more embodiments. FIGS. 6A-6G are discussed with reference to the flowchart of FIG. 7.

Figure 7:
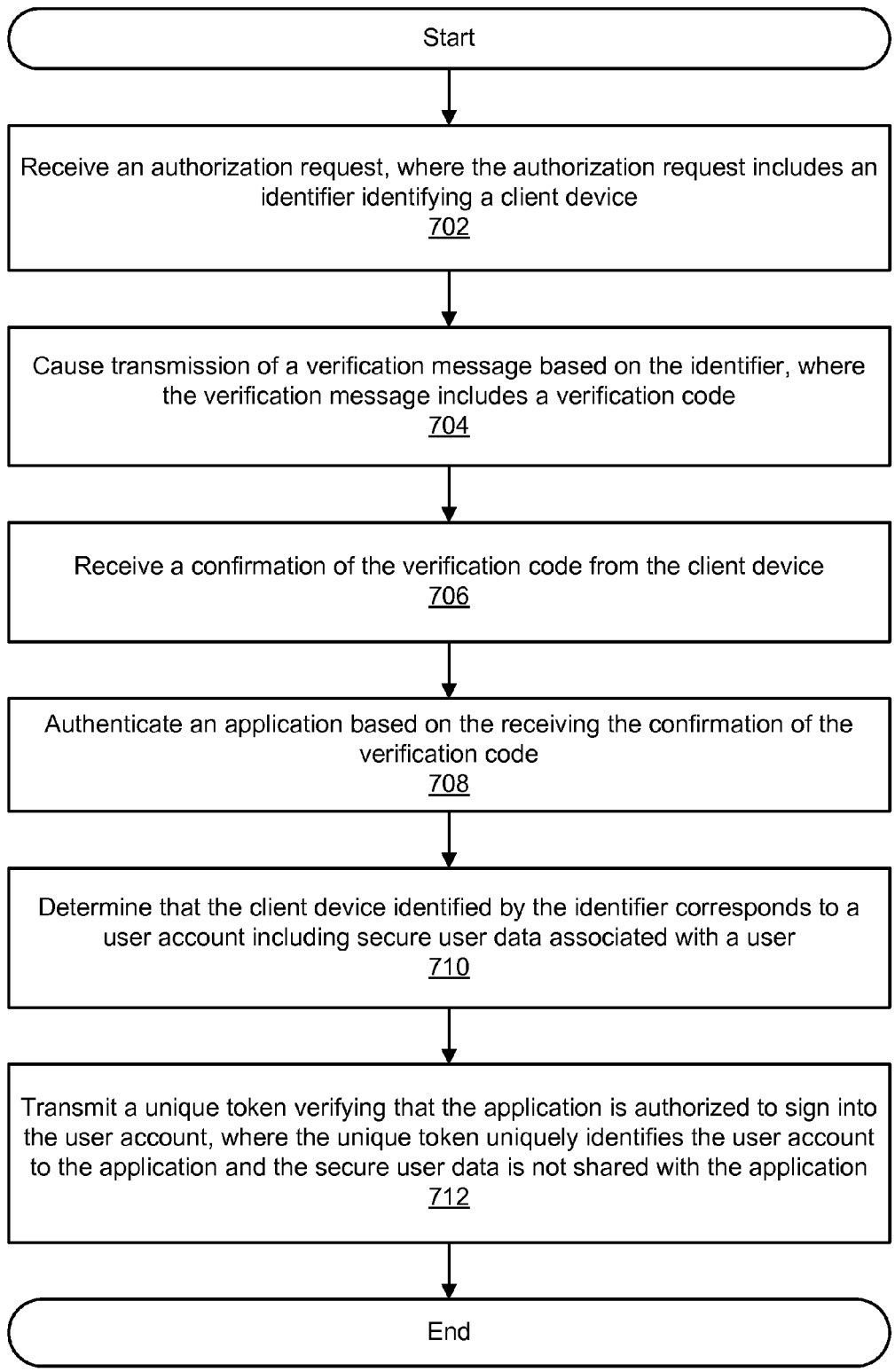
FIG. 7 shows a flowchart in accordance with one or more embodiments.

FIG. 7 shows a flowchart of a method for authentication (e.g., of an application). While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown by FIG. 7 should not be construed as limiting the scope of the invention.

Figures 6A, 6B, 6C, 6D, 6E, 6F, 6G:
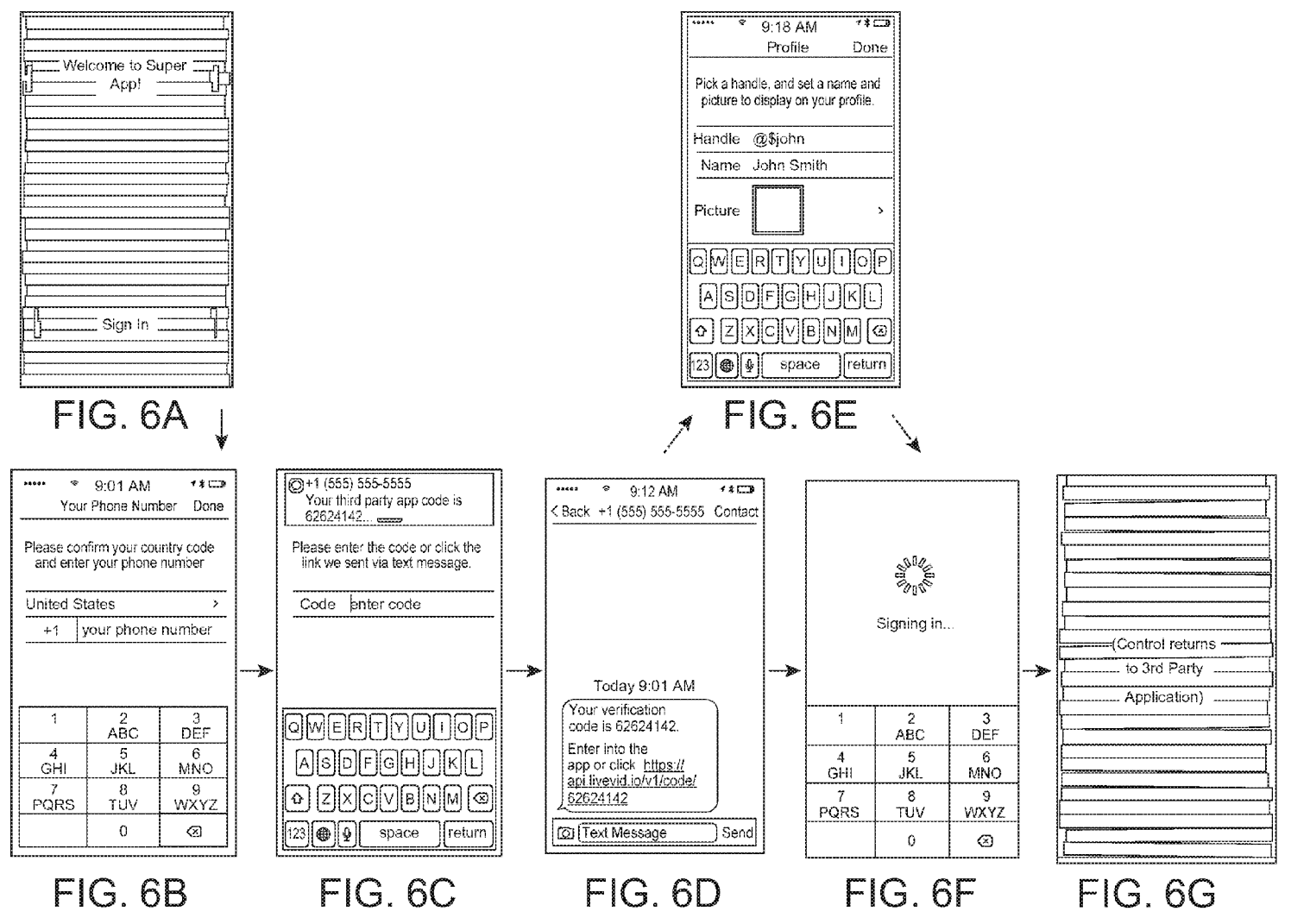

In STEP 702, an authorization request originating from an authorization module of an application executing on a client device is received from the client device. For example, as shown by FIG. 6A, an application may offer sign in capability. As shown by FIG. 6B, the application may launch or provide control to an authorization module. The authorization module may transmit the authorization request after obtaining information relevant to signing in the application.

The authorization request may include an identifier identifying the client device. As shown by FIG. 6B, the authorization module may ask a user of the client device for identifying information of the client device (e.g., the telephone number) or otherwise determine the identifying information, and thereafter include the identifying information in the authorization request as an identifier.

In STEP 704, in response to the authorization request and based on the identifier, transmission of a verification message to the client device is caused, where the verification message includes a verification code. For example, a text message is sent using the telephone number identified by the identifier. FIG. 6C shows that a text message is received while a user interface related to the authorization module requests entry of the verification code. FIG. 6D shows the full content of the text message in a text messaging application of the client device. The text message may include a verification code (e.g., "62624142"). The authorization module may receive the verification code via manual entry by the user or by accessing the text message on the client device. In some embodiments, a deep link facilitating verification code entry is included in the text message.

In STEP 706, a confirmation of the verification code is received from the authorization module of the application executing on the client device. For example, the authorization module may return the verification code (or a representation thereof) in a confirmation message via a communications network (e.g., the Internet).

In STEP 708, the application is authenticated based on the receiving the confirmation of the verification code. Receiving the confirmation confirms that the authorization module making the authorization request is in fact included in the client device identified by the identifier.

In STEP 710, after authenticating the application, the client device identified by the identifier is determined to correspond to a user account including secure user data associated with a user. For example, it may be known that a user account is associated with the client device. The user account may include secure user data. In the event that the identifier does not correspond to a user account, a user account may be created. For example, as shown by FIG. 6E, an opportunity to create an account is provided.

In STEP 712, a unique token verifying that the application is authorized to sign into the user account is transmitted to the authorization module of the application. The unique token may uniquely identify the user account to the application and the secure user data is not shared with the application. For example, as shown by FIG. 6F, the unique token may complete a sign in routine. In some embodiments, a sign-in confirmation in response to a subsequent sign in request from the authorization module may cause the sign in routine to complete.

The authorization module and/or the application can use the unique token to sign into the user account. However, the secure user data may be withheld from the application to maintain privacy or anonymity of the user. As shown by FIG. 6G, control may be returned from the authorization module to the application for continued execution by the application.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the present disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. Some of the steps may be performed simultaneously. For example, in certain circumstances, multitasking and parallel processing may be advantageous. The various example methods described and/or illustrated herein may also omit one or more of the steps described or illustrated herein or include additional steps in addition to those disclosed.

Embodiments may be implemented on a specialized computer system. The specialized computing system can include one or more modified mobile devices (e.g., laptop computer, smart phone, personal digital assistant, tablet computer, or other mobile device), desktop computers, servers, blades in a server chassis, or any other type of computing device(s) that include at least the minimum processing power, memory, and input and output device(s) to perform one or more embodiments.

Figure 8:
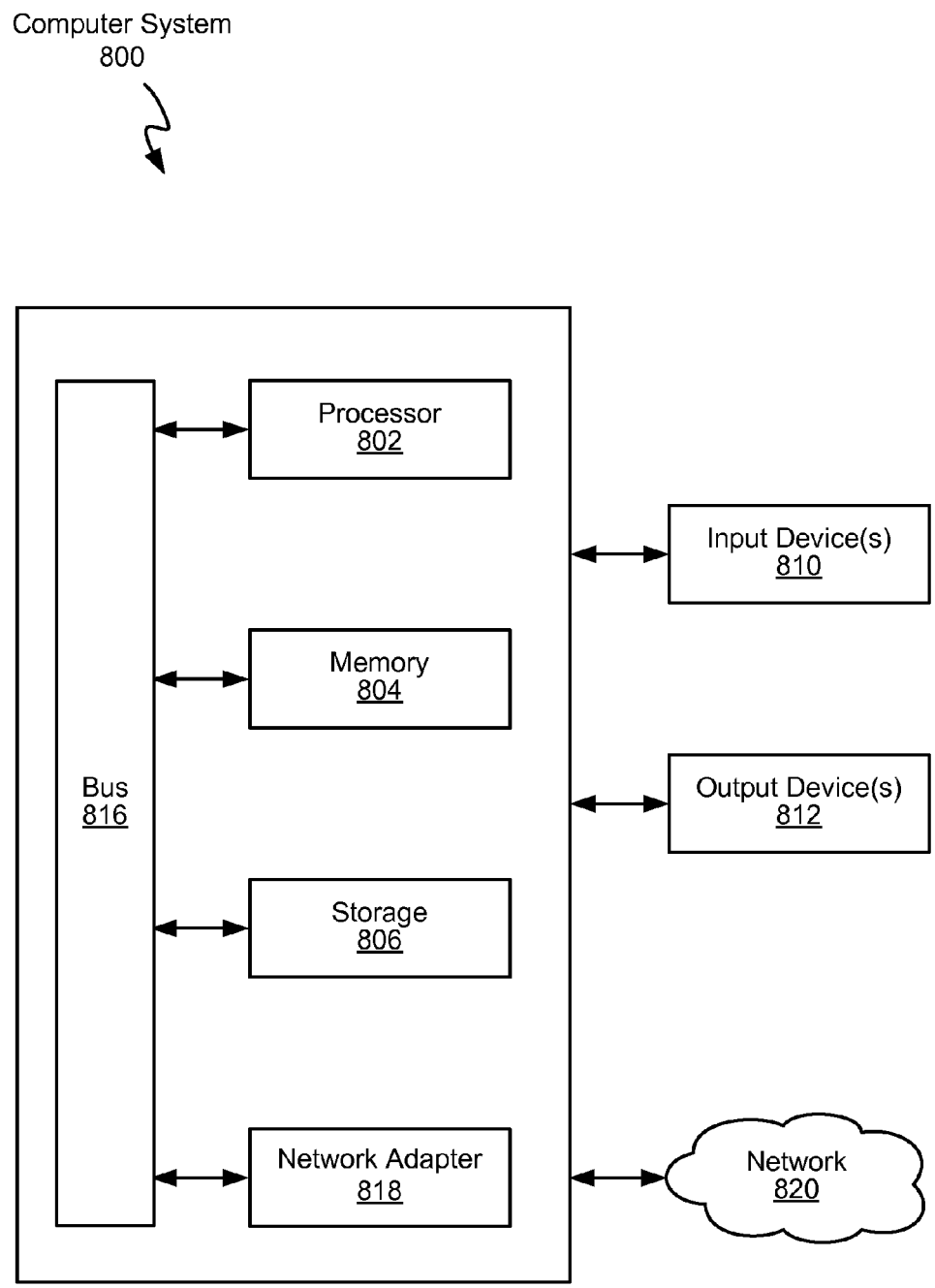
FIG. 8 shows a computer system in accordance with one or more embodiments.

For example, as shown by FIG. 8, the computing system 800 may include one or more computer processor(s) 802, associated memory 804 (e.g., random access memory (RAM), cache memory, flash memory, etc.), one or more storage device(s) 806 (e.g., a hard disk, an optical drive such as a compact disk (CD) drive or digital versatile disk (DVD) drive, a flash memory stick, etc.), a bus 816, and numerous other elements and functionalities. The computer processor(s) 802 may be an integrated circuit for processing instructions. For example, the computer processor(s) may be one or more cores or micro-cores of a processor.

The computing system 800 may also include one or more input device(s) 810, such as a touchscreen, keyboard, mouse, microphone, touchpad, electronic pen, or any other type of input device. Further, the computing system 800 may include one or more output device(s) 812, such as a screen (e.g., a liquid crystal display (LCD), a plasma display, touchscreen, cathode ray tube (CRT) monitor, projector, or other display device), a printer, external storage, or any other output device. The computing system 800 may be connected to a network 820 (e.g., a local area network (LAN), a wide area network (WAN) such as the Internet, mobile network, or any other type of network) via a network interface connection 818. The input and output device(s) may be locally or remotely connected (e.g., via the network 820) to the computer processor(s) 802, memory 804, and storage device(s) 806.

One or more elements of the aforementioned computing system 800 may be located at a remote location and connected to the other elements over a network 820. Further, embodiments may be implemented on a distributed system having a plurality of nodes, where each portion may be located on a subset of nodes within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

For example, one or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface.

One or more elements of the above-described systems (e.g., FIGS. 1-3) may also be implemented using software modules that perform certain tasks. These software modules may include script, batch, or other executable files that may be stored on a computer-readable storage medium or in a computing system. These software modules may configure a computing system to perform one or more of the example embodiments disclosed herein. The computer readable program code can be stored, temporarily or permanently, on one or more non-transitory computer readable storage media. The non-transitory computer readable storage media are executable by one or more computer processors to perform the functionality of one or more components of the above-described systems (e.g., FIGS. 1-3) and/or flowcharts (e.g., FIG. 7). Examples of non-transitory computer-readable media can include, but are not limited to, compact discs (CDs), flash memory, solid state drives, random access memory (RAM), read only memory (ROM), electrically erasable programmable ROM (EEPROM), digital versatile disks (DVDs) or other optical storage, and any other computer-readable media excluding transitory, propagating signals.

It is understood that a "set" can include one or more elements. It is also understood that a "subset" of the set may be a set of which all the elements are contained in the set. In other words, the subset can include fewer elements than the set or all the elements of the set (i.e., the subset can be the same as the set).

While the invention has been described with respect to a limited number of embodiments, those skilled in the art, having benefit of this disclosure, will appreciate that other embodiments may be devised that do not depart from the scope of the invention as disclosed herein.

What is claimed is:

1. A method comprising:
   receiving, at a server, a first authorization request from a client device originating from a first authorization module of a first application executing on the client device, wherein
      the first authorization request comprises an identifier identifying the client device;
      the first authorization request is received via a first communication protocol;
   causing, in response to the first authorization request and based on the identifier, transmission of a verification message to the client device, wherein the verification message comprises a verification code and is transmitted via a second communication protocol;
   receiving, at the server via the first communication protocol, a confirmation of the verification code from the first authorization module of the first application executing on the client device;
   authenticating, at the server, the first application based on the receiving the confirmation of the verification code;
   determining, after authenticating the first application, that the client device identified by the identifier corresponds to a user account that includes secure user data associated with a user; and
   transmitting, to the first authorization module of the first application via the first communication protocol, a first unique token verifying that the first application is authorized to sign into the user account, wherein:
      the first unique token uniquely identifies the user account to the first application, and
      the secure user data is not shared with the first application.

2. The method of claim 1, further comprising:
   receiving, at the server from the client device, a second authorization request originating from a second authorization module of a second application running on the client device, wherein:
      the second authorization request comprises the identifier;
      the second authorization request is received via the first communication protocol; and
   transmitting, to the second authorization module, a second unique token verifying that the second application is authorized to sign into the user account via the first communication protocol, wherein:
      the second unique token uniquely identifies the user account to the second application, and
      the second unique token is different from the first unique token.

3. The method of claim 2, further comprising:
   receiving, from the first authorization module and the second authorization module, secure user data that represents use of the first application and use of the second application by the user; and
   storing the secure user data associated with the first application and the second application in the user account.

4. The method of claim 3, further comprising:
   receiving, from the first authorization module, an advertisement request from the first application; and
   providing, to the first authorization module, an advertisement based on the stored secure user data associated with the second application.

5. The method of claim 1, further comprising:
   receiving, from the first authorization module, a set of contacts associated with the client device;
   identifying, based on the set of contacts, a set of user accounts that use other instances of the first application; and
   providing a set of unique tokens representing each of the user accounts of the set of user accounts to the first authorization module, wherein the first authorization module is operable to provide the set of unique tokens to the first application.

6. The method of claim 1, wherein causing transmission of the verification message via the second communication protocol includes:
   identifying a service provider of the client device identified by the identifier;
   selecting an SMS aggregator based on the service provider; and
   providing the verification message to the SMS aggregator for transmission to the client device.

7. The method of claim 6, further comprising:
   causing transmission of a set of verification messages using a set of SMS aggregators based on the identified service provider, wherein the set of SMS aggregators includes the SMS aggregator;
   monitoring delivery performance of the set of verification messages by each of the set of SMS aggregators;
   calculating a ranking score of each of the set of SMS aggregators based on delivery performance; and
   selecting, based on the ranking scores, a preferred SMS aggregator from the set of SMS aggregators for subsequent verification message transmissions.

8. The method of claim 1:
   wherein transmitting the first unique token further comprises transmitting a cryptographic nonce to the authorization module of the application; and
   the method further comprising:
   storing the cryptographic nonce as a most-recently transmitted nonce in association with the authorization request;
   receiving a sign-in request comprising a hashed value generated from the cryptographic nonce;
   determining that the sign-in request is timely by determining that a locally generated value of the most-recently transmitted nonce matches the hashed value included in the sign-in request; and transmitting a sign-in confirmation to the client device.

9. The method of claim 1, the verification code comprises at least one selected from a group consisting of an alpha-numerical string, a Uniform Resource Locator (URL), an application link, a web link, a deep link, an image, an audio recording, binary file, and a text-based file.

10. A system comprising:
a computer processor;
computer program instructions that when executed by the computer processor cause the computer processor to:
receive, at a server, a first authorization request from a client device originating from a first authorization module of a first application executing on the client device, wherein
the authorization request comprises an identifier identifying the client device;
the first authorization request is received via a first communication protocol;
cause, in response to the authorization request and based on the identifier, transmission of a verification message to the client device, wherein the verification message comprises a verification code and is transmitted via a second communication protocol;
receive, at the server via the first communication protocol, a confirmation of the verification code from the first authorization module of the first application executing on the client device;
authenticate, at the server, the first application based on the receiving the confirmation of the verification code;
determine, after authenticating the first application, that the client device identified by the identifier corresponds to a user account including secure user data associated with a user; and
transmit, to the first authorization module of the first application via the first communication protocol, a unique token verifying that the first application is authorized to sign into the user account, wherein:
the unique token uniquely identifies the user account to the first application, and
the secure user data is not shared with the first application.

11. The system of claim 10, wherein the executed instructions further cause the computer processor to:
receive, from the first authorization module and a second authorization module of the client device, secure user data that represents use of the first application and use of a second application of the client device by the user;
store the secure user data associated with the first application and the second application in the user account;
receive, from the first authorization module, an advertisement request from the first application; and
provide, to the first authorization module, an advertisement based on the stored secure user data associated with the second application.

12. The system of claim 10, wherein the executed instructions further cause the computer processor to:
identify a service provider of the client device identified by the identifier;
cause transmission of a set of verification messages, to a set of client devices comprising the client device, using a set of SMS aggregators based on the service provider;
monitor delivery performance of the set of verification messages by each of the set of SMS aggregators;
calculate a ranking score of each of the set of SMS aggregators based on delivery performance; and
select, based on the ranking scores, a preferred SMS aggregator from the set of SMS aggregators for subsequent verification message transmissions.

13. The system of claim 10, wherein the executed instructions further cause the computer processor to:
transmit a cryptographic nonce to the first authorization module of the first application along with the unique token;
store the cryptographic nonce as a most-recently transmitted nonce in association with the authorization request;
receive a sign-in request comprising a hashed value generated from the cryptographic nonce;
determine that the sign-in request is timely by determining that a locally generated hash value of the most-recently transmitted nonce matches the hashed value included in the sign-in request; and
transmit a sign-in confirmation.

14. A method comprising:
transmitting, from a first authorization module, via a first communication protocol, of a first application executing on a client device, a first authorization request that includes an identifier identifying the client device, wherein the first authorization request is transmitted for verification that the client device identified by the identifier corresponds to a user account including secure user data associated with a user;
receiving, at the first authorization module, via a second communication protocol, of the first application executing on the client device and in response to the first authorization request, a verification code;
transmitting, from the first authorization module, via the first communication protocol, of the first application executing on the client device, a confirmation of the verification code; and
receiving, at the first authorization module, via the first communication protocol, a first unique token verifying that the first application is authorized to sign into the user account, wherein:
the first unique token uniquely identifies the user account to the first application, and
the secure user data is not shared with the first application.

15. The method of claim 14, further comprising:
transmitting, via the first communication protocol, from a second authorization module of a second application executing on the client device, a second authorization request comprising the identifier; and
receiving, at the second authorization module, via a second communication protocol, a second unique token verifying that the second application is authorized to sign into the user account, wherein:
the second unique token uniquely identifies the user account to the second application, and
the second unique token is different from the first unique token.

16. The method of claim 15, further comprising:
transmitting, from the authorization module, via the first communication protocol, and the second authorization module, secure user data that represents use of the first application and use of the second application by the user for storage in the user account.

17. The method of claim 16, further comprising:
transmitting, from the first authorization module, an advertisement request from the first application; and receiving, at the first authorization module, an advertisement based on the stored secure user data associated with the second application.

18. The method of claim 14, further comprising:
transmitting, from the first authorization module, a set of contacts associated with the client device;
receiving, based on the set of contacts, a set of unique tokens representing a set of user accounts that use other instances of the first application; and
providing the set of unique tokens to the first application.

19. The method of claim 14, further comprising:
transmitting, to a third-party server associated with the first application, the first unique token; and
receiving, from the third-party server, application data associated with a third-party user account of the third-party server associated with the first unique token.

20. The method of claim 14, further comprising:
receiving, at the first authorization module, the first authorization request from the first application;
transferring, in response to the first authorization request, a foreground control of the client device from the first application to the first authorization module; and
transferring, in response to receiving the first unique token, the foreground control of the client device from the first authorization module to the first application.

* * * * *